(12) United States Patent
Rebholz et al.

(10) Patent No.: US 11,267,055 B2
(45) Date of Patent: Mar. 8, 2022

(54) CUTTING TOOL HAVING A DEPTH STOP

(71) Applicant: Guehring KG, Albstadt (DE)

(72) Inventors: Felix Rebholz, Frohnstetten (DE); Ingo V. Puttkamer, Albstadt (DE)

(73) Assignee: Guehring KG, Albstadt (DE)

(*) Notice: Subject to any disclaimer, the term of this patent is extended or adjusted under 35 U.S.C. 154(b) by 0 days.

(21) Appl. No.: 17/078,751

(22) Filed: Oct. 23, 2020

(65) Prior Publication Data
US 2021/0146452 A1 May 20, 2021

Related U.S. Application Data

(63) Continuation of application No. PCT/EP2019/061217, filed on May 2, 2019.

(30) Foreign Application Priority Data

May 4, 2018 (DE) .................... 10 2018 206 889.5

(51) Int. Cl.
*B23B 49/00* (2006.01)
*B23B 51/10* (2006.01)

(52) U.S. Cl.
CPC .......... *B23B 49/005* (2013.01); *B23B 51/104* (2013.01); *Y10T 408/99* (2015.01)

(58) Field of Classification Search
CPC .... B23B 49/005; B23B 51/104; Y10T 408/99
See application file for complete search history.

(56) References Cited

U.S. PATENT DOCUMENTS

| 2,422,279 A | | 5/1944 | Zimmer | |
|---|---|---|---|---|
| 2,359,859 A | * | 10/1944 | Jarvis | B23B 51/104 408/112 |
| 2,710,549 A | | 1/1952 | Cogsdill | |
| 2,608,114 A | * | 8/1952 | Martin | B23B 51/104 408/112 |
| 3,060,772 A | * | 10/1962 | Crump | B23B 51/104 408/112 |
| 3,241,405 A | | 3/1966 | Davis | |
| 4,115,017 A | | 9/1978 | Wilhelmsson | |
| 6,238,150 B1 | * | 5/2001 | Yamada | B23B 51/02 407/9 |
| 2017/0274459 A1 | | 9/2017 | Rebholz | |
| 2020/0238398 A1 | * | 7/2020 | Von Puttkammer | F16C 19/545 |

FOREIGN PATENT DOCUMENTS

| CH | 464 649 | 6/1967 |
|---|---|---|
| DE | 729 215 | 12/1942 |
| DE | 858 487 | 7/1949 |
| DE | 26 21 386 A1 | 9/1977 |
| DE | 10 2014 115 768 B3 | 1/2016 |
| EP | 346231 A * | 12/1989 |
| WO | WO-2016023944 A1 * | 2/2016 ........... B23B 49/005 |

OTHER PUBLICATIONS

DMPAregister Print Out dated Oct. 22, 2020.
International Search Report and Written Opinion (Application No. PCT/EP2019/061217) dated Jul. 9, 2019.

* cited by examiner

*Primary Examiner* — Eric A. Gates
(74) *Attorney, Agent, or Firm* — Burr & Brown, PLLC

(57) ABSTRACT

A cutting tool having a shank and a cutting head, wherein the shank carries a depth stop, which limits penetration depth into a workpiece, via at least one pivot bearing, and the depth stop is spring-preloaded away from the cutting head, via the at least one pivot bearing, against a shank-side stop.

10 Claims, 1 Drawing Sheet

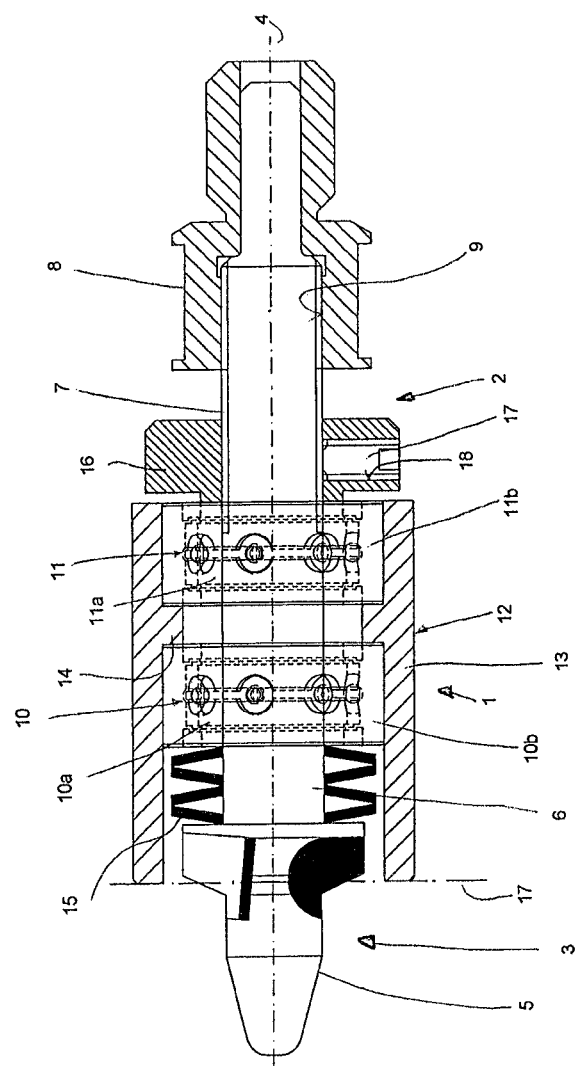

CUTTING TOOL HAVING A DEPTH STOP

The invention relates to a cutting tool having a depth stop, which limits the penetration depth into a workpiece.

DE 102014115768 B3 discloses a rotationally driven cutting tool, in particular a drilling, milling, or countersinking tool, having a depth stop, which limits the penetration depth of the cutting tool into a workpiece. The dept stop in particular has a stop sleeve, which is carried in a rotationally movable manner via two pivot bearings. The two pivot bearings sit on a shank sleeve at an axial distance from one another. The shank sleeve can be fixed to the shank of the cutting tool.

In an embodiment shown in the publication, the two pivot bearings on the shank sleeve are in each case axially secured by means of bearing rings fixed to the shank sleeve. However, the axial bearing clearance, which is inevitably at hand, around which the outer ring of each pivot bearing, which carries the stop sleeve, can be displaced with respect to the inner ring of the respective pivot bearing, which sits on the shank sleeve, makes a precise positioning of the depth stop in the axial direction of the cutting tool more difficult, as a result of which a predetermined target penetration depth cannot be readily attained in this way. In the case of a machining by means of countersinking, the created countersinking surface could thus, for example, be located higher or lower as undesirable. However, an exact countersinking depth or position accuracy, respectively, of the created countersinking surface is often important, e.g. when producing counterbores in aircraft construction.

In another embodiment shown in the publication, the two pivot bearings are braced between a bearing clamping nut screwed onto the shank sleeve and a counter bearing ring at the shank sleeve. The bracing of the two pivot bearings, i.e. the bearing clearance, can be set via the bearing clamping nut. In the case of an incorrect assembly or an incorrect operation of the bearing clamping nut, however, the clamping force exerted on the two pivot bearings may be to large or too small. If the clamping force is too large, damages to or etching of the pivot bearings may occur, while an overly large bearing clearance and an indeterminable or inaccurate positioning of the depth stop may be the result of a clamping force, which is too small.

The invention is now based on the object of creating a cutting tool having a rotationally movable depth stop, which provides for an axial positioning of the depth stop, which is as free from clearance as possible and precise, at the cutting tool.

This object is solved by means of a cutting tool comprising the features of claim 1. Advantageous or preferred embodiments are subject matter of dependent claims.

A cutting tool according to the invention, e.g. a drilling, milling or countersinking tool, has a shank and a cutting head connected to the shank. The cutting head can be formed with one or multiple blades and can be connected to the shank in a releasable manner, e.g. in a positive and/or non-positive manner, or in a non-releasable manner, e.g. by means of a substance-to-substance bond, or by means of a one-piece production. The releasable connection allows for an exchange of the cutting head, e.g. in the case of wear. The non-releasable connection can simplify the production of the cutting tool. The cutting head or the cutting tool, respectively, can be retained on a tool holder or the like via the shank. The shank carries a depth stop, which limits the penetration depth into a workpiece, via at least one pivot bearing, which can in particular be formed from a rolling bearing, e.g. ball bearing. To fulfill its function, the depth stop is secured to the at least one pivot bearing in the axial direction opposite to the tool feed direction. According to the invention, the depth stop is to be spring-preloaded away from the cutting head, via the at least one pivot bearing, against a shank-side stop. A reduction of an axial bearing clearance in the at least one pivot bearing and/or an axial assembly clearance between the depth stop and the at least one pivot bearing is thus attained by means of the spring-preloading, as a result of which a clearance-free and precise positioning of the depth stop in the axial direction is made possible on the cutting tool.

If the at least one pivot bearing is moreover axially displaceable, and the shank-side stop is formed from an axially adjustable setting stop, it is furthermore possible to set the axial position of the spring-preloaded depth stop relative to the cutting head.

In a preferred embodiment, the cutting tool is a countersinking tool having a cutting head with multiple blades. A cutting height difference of the blades caused by the grinding of the clearance surfaces can frequently be observed in the case of a tool of this type. The highest blade in the tool feed direction, which first cuts or enters, respectively, into the workpiece during a machining by means of countersinking and which thus creates the largest countersinking depth or the largest countersinking diameter, respectively, is assumed for the axial position setting of the depth stop on the shank of the countersinking tool. The radius point, which corresponds to a predefined target diameter for the counterbore, is determined for this highest blade. The zero line, to which the depth stop is to be set, then lies axially at the height of this radius point. The at least one pivot bearing, which carries the depth stop, is adjusted for this purpose via the setting stop under the spring-preloading in the direction of the cutting head until the depth stop comes to rest on the above-mentioned zero line. Due to the spring-preloading, the axial bearing clearance and/or assembly clearance is minimized when setting the depth stop. The depth stop can thus be set precisely to the zero line, which determines the predetermined target diameter for the highest blade for the countersinking.

The spring-preloading can be attained by means of a compression spring, which pushes the depth stop, via the at least one pivot bearing, against the shank-side stop. Towards the cutting head, the compression spring can be supported, for example, directly on the rear side of the cutting head, which contributes to a reduction of the components to be assembled and to a simplification of the assembly of the cutting tool. In the alternative, the cutting tool can have a spring stop, which is independent of the cutting head and on which the compression spring is supported towards the cutting head.

The compression spring can furthermore be formed from a disk spring unit, which sits on the shank. A stable preloading, which is adapted to the respectively used at least one pivot bearing and to the assembly, can be attained in a simple and reliable manner via a suitable configuration of the disk spring unit.

The spring-preloading can furthermore act on the depth stop, which is carried by the at least one pivot bearing, i.e. indirectly on the at least one pivot bearing, or directly on the at least one pivot bearing. For example, the above-mentioned compression spring can be supported on an inner bearing ring of a pivot bearing located closest to the cutting head.

The at least one pivot bearing and the shank-side stop can be arranged on the shank, for example, via a bushing fixed to the shank, i.e. indirectly or directly. The direct arrangement contributes to a reduction of the components, which are to be assembled, and of the assembly clearance associated therewith, and to a simplification of the assembly of the depth stop on the shank of the cutting tool.

A simple position setting of the depth stop can be accomplished, for example, when the shank-side stop is an adjusting stop, which is formed from a bushing, which is arranged on the shank so that the position can be set. The axial position setting of the bushing forming the setting stop can take place by means of screw-connection or displacement. After position setting has occurred, the bushing can be capable of being axially fixed by means of a clamping screw. In a preferred embodiment, the setting stop has a bushing, which is screw-connected to a threaded portion provided at the shank.

In a preferred embodiment, the depth stop is formed at a sleeve body, which receives the at least one pivot bearing, following the example of the cutting tools disclosed in the above-discussed DE 102014115768 B3. The sleeve body can engage around the cutting head.

In this case, the spring-preloading according to the invention of the depth stop can be accomplished in a simple way, via the at least one pivot bearing, against the shank-side stop in that the sleeve body is supported on the at least one pivot bearing in a direction opposite to the tool feed direction, for example by means of a annular projection, which projects radially to the inside.

In a possible embodiment, the depth stop can be carried, for example, by exactly one pivot bearing. In this case, the spring-preloading and the arrangement of the pivot bearing relative to the sleeve body and the shank-side stop can be designed in such a way that, viewed in a direction opposite to the tool feed direction, a spring-preloading force is introduced into the sleeve body, the annular projection of the sleeve body pushes against an outer bearing ring of the pivot bearing, and an inner bearing ring of the pivot bearing pushes against the shank-side stop.

However, in a preferred embodiment, the depth stop is supported by two pivot bearings, which are arranged on both sides of the annular projection and which are thus arranged at an axial distance from one another due to the annular projection. In this case, the spring-preloading and the arrangement of the pivot bearings relative to the sleeve body and shank-side stop can be designed in such a way that, viewed in a direction opposite to the tool feed direction, a spring-preloading force is introduced into an inner bearing ring of the pivot bearing close to the cutting head, the outer bearing ring of the pivot bearing close to the cutting head pushes against the annular projection of the sleeve body, the annular projection pushes against the outer bearing ring of the pivot bearing distant from the cutting head, and the inner bearing ring of the pivot bearing distant from the cutting head pushes against the shank-side stop.

A bearing clearance and/or assembly clearance is minimized in the above-discussed embodiments by means of the spring-preloading.

A preferred embodiment of a cutting tool according to the invention will be described below on the basis of a schematic drawing.

The sole FIGURE shows a countersinking tool, which carries a depth stop, as example for a cutting tool according to the invention.

The countersinking tool 1 shown in the FIGURE has a shank 2 and a cutting head 3 connected to the shank 2. Reference numeral 4 specifies the axis of rotation. In the shown embodiment, the cutting head 3 is formed with multiple blades and has a guide pin 5. In the shown embodiment, the cutting head 3 is connected in a non-releasable manner to the shank 2, in particular to a cylinder portion 6 of the shank 2. In addition to the already mentioned cylinder portion 6, which carries the cutting head 3, the shank 2, which is embodied in several pieces in the shown embodiment, has a threaded portion 7, which connects to the cylinder portion 6. In the shown embodiment, the threaded portion 7 is connected in a non-releasable manner to the cylinder portion 6. In the shown embodiment, the cutting head 3 and the shank 2, in particular the cylinder portion 6 and the threaded portion 7, are in particular made from one piece. The threaded portion 7 is screw-connected to a coupling piece 8 for connecting the countersinking tool 1 to a (non-illustrated) tool holder or the like. As is shown in the FIGURE, the threaded portion 7 is screwed into a threaded bore 9 of the coupling piece 8 for this purpose.

The cylinder portion 6 of the shank 2 carries a depth stop 12, which limits the countersinking depth, via two rolling bearings 10, 11, which are formed by ball bearings in the shown embodiment. The inner bearing rings 10a, 11a of the two rolling bearings 10, 11 are in each case arranged in an axially displaceable manner on the cylinder portion 6 with a defined clearance adaptation. The outer bearing rings 10b, 11b of the two rolling bearings 10, 11 are received at an axial distance from one another with a defined press fit in a sleeve body 13 of the depth stop 12, which engages around the cutting head 3. For this purpose, the sleeve body 13 has a annular projection 14, which projects radially to the inside. On both sides of the annular projection 14, the two rolling bearings 10, 11 are supported on said annular projection, as it is shown in the FIGURE. The axial length of the annular projection 14 thus determines the axial distance of the two rolling bearings 10, 11.

A compression spring 15 arranged between the cutting head 3 and the rolling bearing 10 close to the cutting head creates a spring-preloading, by means of which the depth stop 12 is preloaded, via the two rolling bearings 10, 11, away from the cutting head 3 against a setting stop 16, which is screwed onto the threaded portion 7. As it is shown in the FIGURE, the compression spring 15 formed from a disk spring unit is clamped in particular between the rear side of the cutting head 3 and the inner bearing ring 10a of the rolling bearing 10 close to the cutting head. The inner bearing ring 11a of the rolling bearing 11 close to the cutting head furthermore abuts on the one setting stop 16, which is screwed onto the threaded portion 7 of the shank 2. In the shown embodiment, the setting stop 16 is formed from a knurled nut, which is screwed onto the threaded portion 7. After the position has been set, the setting stop 16 can be fixed by means of a clamping screw 17, which pushes against the threaded portion 7 and which is screwed into a radially oriented threaded bore 18 of the setting stop 16.

In the state shown in the FIGURE, the spring force of the compression spring 15 is introduced into the inner bearing ring 10a of the rolling bearing 10 close to the cutting head and is transferred to the setting stop 16 via the inner bearing ring 11a of the bearing ring 11 distant from the cutting head, which abuts on the setting stop 16.

A reduction of an axial bearing clearance in the two rolling bearings 10, 11 and an axial assembly clearance between the sleeve body 13 and the two rolling bearings 10, 11 is attained by means of the spring-preloading, as a result of which a clearance-free and precise positioning and position setting of the depth stop 12 in the axial direction is made possible.

In the shown embodiment, the depth stop 12 is positioned as follows. Due to the grinding of the clearance surfaces, the blades, which are not shown in more detail, on the cutting head 3 usually have a cutting height difference (which is not shown in the FIGURE). For the axial position setting of the depth stop 12, a highest blade in the tool feed direction is now assumed, which first cuts or enters, respectively, into a workpiece during a machining by means of countersinking and thus creates the largest countersinking depth or the largest countersinking diameter, respectively. The radius point, which corresponds to a predefined target diameter for the counterbore, is determined for this highest blade. A zero line 17, which is suggested in a dashed manner in the FIGURE, to which the depth stop 12 is to be set, then lies axially at the height of this radius point. For this purpose, the rolling bearings 10, 11, which carry the depth stop 12, are adjusted against or at the spring-preloading, respectively, in the direction of the cutting head 3 until the depth stop 12 comes to rest on the above-mentioned zero line 17. Due to the spring-preloading, an axial bearing clearance and/or assembly clearance is minimized when setting the depth stop 12. The depth stop 12 can thus be set precisely to the zero line 17, which determines the predetermined target diameter for the countersink for the highest blade.

It goes without saying that the feature combinations resulting for the person of skill in the art from the claims as well as from the acknowledgement of the claims result in various modifications for the embodiment shown in the FIGURE.

For instance, the cutting tool according to the invention is not limited to a countersinking tool. It can also be a drilling or milling tool, for example, the respectively available cutting head can be formed with one or multiple blades.

Deviating from the shown embodiment, in which the cutting head is made from one piece with the shank, the cutting head and the shank can be made separately, e.g. of different materials (for example the cutting head of a harder material and the cutting head of a softer material), and can then be connected to one another in a non-releasable manner by means of a substance-to-substance bond, e.g. by means of soldering. As an alternative to the non-releasable connection of the cutting head with the shank, the cutting head can also be connected in a releasable manner, i.e. in an exchangeable manner, to the shank by means of a positive and/or non-positive connection. In addition to the exchangeability, this alternative also provides the opportunity of producing of and of combining the cutting head and the shank from different materials.

The shank can furthermore be formed cylindrically throughout. The shank-side stop could be formed in this case by a bushing, which can be axially displaced on the cylindrical shank and which can be axially fixed to the shank by means of a clamping screw. In particular in this case, the cylindrical shank can be clamped directly into a tool holder (chuck) or the like without interconnecting the coupling piece provided in the above embodiment.

At least one pivot bearing, which carries the depth stop, is usually sufficient for the rotationally movable bearing of the depth step. As in the shown embodiment, the pivot bearing can be formed from a rolling bearing, in particular ball bearing. This is not absolutely necessary, however. Instead of a rolling bearing, a sliding bearing as well as a combination of different bearing types could also be used.

Advantageously, the depth stop can be axially adjusted, as in the shown embodiment. This is also not absolutely necessary, however. The depth stop can be secured, for example, to the shaft in an axially unchangeable manner.

A spring-preloading exerted on the depth stop can be created via a compression spring arranged between the cutting head and the depth stop, as in the shown embodiment. Instead of a compression spring, it would generally be possible to use a tension spring, which pulls the depth stop axially away from the cutting head against a shank-side stop.

Instead of a disk spring unit, a coil spring or coil spring assembly, respectively, can generally also be used to create the spring-preloading.

Deviating from the shown embodiment, in which the two rolling bearings and the shank-side sit directly on the shank, the rolling bearings and the shank-side stop could also be arranged on the shank, for example, via a bushing fixed to the shank, i.e., indirectly, following the example of DE1020141157687 B3.

The invention claimed is:

1. A cutting tool having a shank and a cutting head, the cutting head capable of being rotated about an axis wherein
   the shank carries a depth stop, which limits penetration depth into a workpiece, via at least one pivot bearing,
   the depth stop is spring-preloaded away from the cutting head, via the at least one pivot bearing, against a shank-side stop,
   the at least one pivot bearing is axially displaceable, and
   the shank-side stop is threaded on the shank, whereby an axial position of the shank-side stop is capable of being adjusted by rotating the shank-side stop relative to the axis.

2. The cutting tool according to claim 1, wherein a compression spring is arranged between the cutting head and the at least one pivot bearing.

3. The cutting tool according to claim 2, wherein the compression spring is supported on the cutting head.

4. The cutting tool according to claim 2, wherein the compression spring is formed from a disk spring unit.

5. The cutting tool according to claim 1 wherein the setting stop is formed from a bushing, which is arranged on the shank so that the position can be set.

6. The cutting tool according to claim 1, wherein the depth stop is formed at a sleeve body, which receives the at least one pivot bearing.

7. The cutting tool according to claim 6, wherein the at least one pivot bearing is axially supported on an annular projection of the sleeve body projecting radially inward.

8. The cutting tool according to claim 7, wherein two pivot bearings are arranged on both sides of the annular projection.

9. The cutting tool according to claim 1, wherein the at least one pivot bearing is formed from a rolling bearing.

10. The cutting tool according to claim 1, wherein the at least one pivot bearing and the shank-side stop sit directly on the shank.

* * * * *